Figures 1, 2:
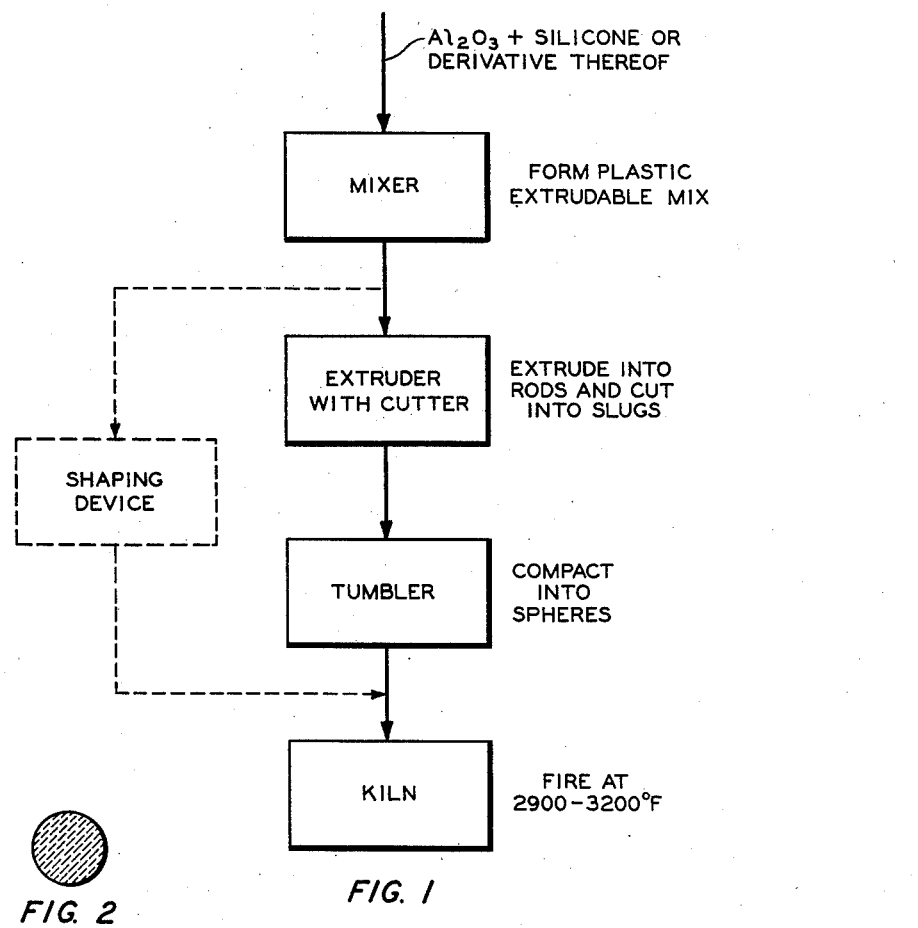

June 9, 1953     L. C. BEARER     2,641,044

PROCESS FOR MANUFACTURING MULLITE-CONTAINING REFRACTORIES

Filed Oct. 24, 1949

INVENTOR.
L. C. BEARER

BY Hudson and Young

ATTORNEYS

Patented June 9, 1953

2,641,044

UNITED STATES PATENT OFFICE 2,641,044

PROCESS FOR MANUFACTURING MULLITE-CONTAINING REFRACTORIES

Louis C. Bearer, Bartlesville, Okla., assignor to Phillips Petroleum Company, a corporation of Delaware Application October 24, 1949, Serial No. 123,313

11 Claims. (Cl. 25—156)

This invention relates to mullite-containing articles and their methods of manufacture. A specific aspect of the invention relates to a method of preparing alumina-mullite refractory pebbles for use in heat-exchange processes.

The use of refractories containing mullite has become quite extensive. Such refractories have utility in manufacturing processes conducted in furnaces and in pebble heater apparatus as well as in other installations in which the apparatus elements are subjected to extremely high temperatures.

Mullite which has the formula $3Al_2O_3 \cdot 2SiO_2$ is a synthetic aluminum silicate which may be formed by the reaction of alumina and silica at temperatures in the neighborhood of 3000° F. and higher and by decomposition and rearrangement of aluminum silicates of lower alumina content. The naturally occurring aluminum silicates contain alumina and silica in the ratio of 1 alumina to 2 silica and also in the ratio of 1 to 1. The aluminum silicates andalusite, kyanite, and sillimanite ($Al_2O_3 \cdot SiO_2$), convert to mullite at temperatures of about 2460° F., 2415° F., and 2786° F., respectively, and the clays, kaolin and ball clays ($Al_2O_3 \cdot 2SiO_2$), are converted to mullite when fired at slightly lower temperatures. However, such conversion of aluminum silicates to mullite leaves free silica which readily reacts with impurities in the aluminum silicates to form glass. It is well known that glass in refractory articles is detrimental because of the lower melting point and frangible character imparted to the refractory by the presence of such glass. Even as little as two weight per cent of glass in a refractory and, especially in pebble heater pebbles, is found to materially increase the frangibility of the refractories and breakage rate of the pebbles. In pebble heater processes pebbles are subjected to extremely high temperatures and to rapid changes in temperature as well as to abrasion and mechanical shock. Pebble temperature changes frequently amount to as much as 2000° F. per minute in some pebble heater type processes. In a pebble heater process requiring the circulation of between 25,000 and 35,000 pounds of pebbles per hour with the attendant mechanical and thermal shock to which they are subjected, it is found that commercial grade alumina pebbles suffer losses due to abrasion and breakage in the neighborhood of 500 pounds per day. The incorporation of mullite into alumina pebbles has decreased the breakage and attrition rate of the pebbles in this type of operation but pebble loss is still a major problem in pebble heater operation.

It is an object of the present invention to provide a method of forming mullite in refractory articles while avoiding the formation of glass therein. Another object of the invention is to provide a method for manufacturing refractory articles of improved strength and toughness. A further object of the invention is to provide a method of manufacturing heat-exchange pebbles containing mullite which are substantially free of glass.

Figure 1 of the drawing represents a simple illustration of the essential steps of the process and is self-explanatory. Figure 2 is a representation of a cross-section of one of the pebbles made by the inventive process and needs no further explanation.

I have found a method of forming mullite in refractories without the formation of glass. The invention entails incorporating into an alumina mix the silica required to react with the alumina to form mullite in the form of a silicone or certain derivatives thereof. A silicone decomposes and oxidizes to a pure silica residue at high temperatures. By forming a mix of alumina and silica in which the ratio of alumina to silica is substantially greater than 3 to 2 and incorporating the silica in the form of a silicone or certain substitution products of silicone, compacting the mix into refractory articles, and firing them at a temperature in the range of 2900 to 3200° F., the silicone or related compound is converted to pure silica which then reacts with alumina to form mullite without introducing any appreciable amount of glass into the refractory.

A silicone is a polymeric organosiloxane composed of multiples of the structure

where R is a hydrocarbon radical, or derived therefrom by substitution of oxygen for a portion of the organic groups and the term shall be understood to have this meaning wherever used in the specification and claims. There are three classes of silicones, (1) oils which are made up of linear molecules of finite length, (2) resins made up of cross-linked aggregates of cyclic and linear strctures, and (3) elastomers which are superpolymers of much higher molecular weight and of unknown configuration. On the basis of the R group attached to the silicon, silicones are divided into alkyl, aryl, and mixed alkyl-aryl silicones.

Any of the silicones, whether liquid or solid, are within the scope of the invention because all of them are converted to a pure white silica residue when heated to temperatures of approximately 1000° F. up to about 1400° F., depending upon the concentration of oxygen in the ambient gas at the time of firing. In pure oxygen the silicones are converted to pure silica at temperatures just below 1000° F. while higher temperatures are required in ordinary atmosphere. Obviously, the hydrocarbon radicals are oxidized to carbon oxides and water.

Derivatives of silicones in which the R radical is substituted by a volatile radical so that the derivative decomposes to silica leaving only a silica residue in the fired refractory are suitable substitutes for silicones in the process of the invention. Examples of silicones derivatives and substitution products are the halosilanes (halogen substituted silicones containing at least one Si-halogen bond), the silanes (H substituted silicones), the silazines (N derivatives of silanes), and the silicols (Hydroxyl derivatives of silanes). Compounds included in the scope of the invention comprise those having the basic structure

in which any number of the R's may be substituted by other radicals which are volatilized upon decomposition of the compound so as to leave a substantially pure silica residue. Also included are structures of the type

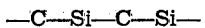

and R₃Si—SiR₃.

It is found that the liquid silicones have an unexpected advantage in manufacturing refractory articles because they serve as excellent plasticizing agents in the alumina mix. Solid silicones may be incorporated in the mix in the form of a powder together with any suitable conventional plasticizing agent or the solid silicone may be dissolved in a suitable solvent, such as acetone, liquid hydrocarbons, etc., in which case the solvent may be selected for its plasticizing properties for an alumina mix.

The range of compositions of the refractories within the scope of the invention runs from 100% mullite to as low as 1% mullite, the balance being alumina or alumina and other refractory grain which does not react with silica. Silicon carbide is an example of a material which may be incorporated in a mix together with alumina and a silicone to form a composition consisting of silicon carbide, alumina, and mullite in which the mullite serves as a bonding material dispersed throughout the composition. Sufficient silicone may be combined with pure alumina in stoichiometric proportions to form mullite so that theoretically all of the alumina and silica combine. However, since free silica is undesirable in a refractory material which is subjected to mechanical shock at elevated temperatures, it is desirable to include more than the stoichiometric amount of alumina and thereby assure combination of all of the silica in the mix.

Alumina raw material should be at least 99% pure and preferably 99.5%. A typical analysis of alpha corundum suitable for the process is as follows:

|  | Per cent |
|---|---|
| $Al_2O_3$ | 99.5 |
| $Na_2O$ | 0.20 |
| $Fe_2O_3$ | 0.25 |
| $SiO_2$ | 0.05 |

However, the alpha corundum may be made from any aluminum oxide material by suitable purification and is preferably precalcined at a temperature in the range of about 1800 to 2200° F. for best results. Any of the substantially pure alumina hydrates which are readily convertible to alpha corundum upon heating to the above range may be used as the source of the alumina for the refractory. Gamma alumina readily converts to the alpha form and is suitable. Purified bauxite and the alumina manufactured by the Bayer process are examples of desirable raw materials for the alumina. At least a substantial proportion of the alumina raw material should be comminuted to a powder of 150 mesh or finer.

The refractories or pebbles may be made by any of the conventional methods including machining, casting, molding, jiggering, etc. In any case it is important to form a plastic mix of suitable consistency for forming into compact shapes which are sufficiently rigid to hold their form during the firing operation. A preferred method of forming the mix into pebbles is to extrude the same into rod-like pieces, cut the rods into slugs of a length approximating their diameter, and then to compact the slugs into spheres by tumbling in a 3-dimensional tumbling drum.

The firing temperature for refractories of the invention is critical and must lie in the range of 2900 to 3200° F. Temperatures below this range fail to react all of the silica with the alumina and properly bond the crystals of the refractory. Temperatures above 3200° F. produce refractories of inferior elasticity and shock resistance. The minimum time required to properly react the constituents and bond the refractory grains lies in the range of 12 to 2 hours, i. e., 12 hours at 2900° F. down to 2 hours at 3200° F. However, longer firing times are beneficial and there is apparently no upper limit on the amount of firing time, providing the upper temperature of the range is not exceeded. It is extremely important when firing refractories in large quantities such as the firing of large masses of pebbles that the individual refractories be fired uniformly within the temperature range.

In making refractory compositions of low mullite content it may be found that the amount of silicone required is insufficient to properly plasticize the alumina mix. In such cases additional plasticizing and binding agent in the form of water and/or a volatilizable organic binder such as Sterotex (hydrogenated corn oil), any of the synthetic or natural resins, petroleum pitch, stearic acid, aluminum stearate, carboxymethyl cellulose, starch, flour, molasses, sugar, dextrin, shellac, glue, etc., may be incorporated in suitable amounts to form a homogeneous mix which is readily compactable into relatively fixed shapes for firing. One of the most suitable plasticizers is found to be Sterotex.

The following examples illustrate the use of silicones in preparing mullite-containing refractories.

*Example I*

In making refractories containing 95% alumina and 5% mullite (weight per cent), a homogeneous plastic mix consisting of 98.6 parts of 325 mesh Bayer process alumina of 99.5% purity, 1.8 parts of a methyl silicone of the formula $(CH_3)_{10}Si_4O_3$ and 3 parts of Sterotex (all parts by weight) is formed by intimately mulling the ingredients in mulling pens. The mix is then extruded into rods 7/16" in diameter and the rods are cut into slugs 7/16" long. The slugs are tumbled in a 3-dimensional tumbling drum and formed into spheres. The spheres are then fired in a periodic kiln at 3150° F. for 6 hours.

The resulting pebbles are smooth, hard, rugged alumina-mullite spheres of about 3/8" diameter substantially free of unreacted silica and glass, and have substantially longer life in pebble heater processes than pebbles of similar composition made by incorporating the silica in the form of naturally occurring aluminum silicates.

*Example II*

When manufacturing refractory brick of the compoosition of the pebbles of Example I but utilizing an ethyl silicone of the formula

[(C$_2$H$_5$)$_3$Si]$_2$O it requires 2.9 parts silicone to 98.7 parts of alumina. The resulting brick have refractory and other qualities similar to the pebbles of Example I and are likewise more resistant to abrasion and breakage in handling and in service than other alumina-mullite bricks of similar composition but containing small amounts (even as low as 1%) of glass.

In making refractories containing upwards of about 12 per cent by weight of mullite the use of liquid silicones as the source of the silica produces too thin a mix for proper handling and compacting and it is found particularly advantageous to utilize a powdered silicone such as an aryl silicone of the formula [(C$_6$H$_5$)$_2$SiO]$x$ where $x$ is an integer greater than 1, in the proper proportions with respect to the liquid silicone and the alumina to impart suitable plasticity to the mix and provide the required amount of silica for the mullite content desired.

Certain modifications of the invention will become apparent to those skilled in the art and the illustrative details disclosed are not to be construed as imposing unnecessary limitations on the invention.

I claim:

1. A process for manufacturing glass-free refractory articles consisting essentially of refractory material bonded with mullite, which comprises preparing a homogeneous plastic mix including alumina grain, other refractory material in the form of grain, and a compound selected from the group consisting of silicones and derivatives of silicones which are converted to pure silica by firing, the alumina being in stoichiometric excess of the silica equivalent of said compound required to form mullite with said alumina, forming said mix into shapes, and firing said shapes at a temperature in the range of 2900 to 3200° F. so as to decompose and oxidize said silicone to pure silica and react said alumina and said silica to form mullite as a bond for the refractory grain.

2. A process for manufacturing glass-free shaped refractory articles containing mullite which comprises preparing a plastic homogeneous mix of powdered alumina of at least 99% purity and a silicone, the mol ratio of alumina to the silica equivalent in said mix being greater than 3 to 2, forming said mix into shapes, firing said shapes at a temperature in the range of 2900 to 3200° F. so as to decompose and oxidize said silicone to pure silica and react said silica with alumina to form mullite.

3. A process for manufacturing glass-free refractory spherical pebbles containing mullite which comprises preparing a plastic homogeneous mix of powdered alumina of at least 99% purity and a silicone, the mol ratio of alumina to the silica equivalent in said mix being greater than 3 to 2, forming said mix into small compact spheres, firing said spheres at a temperature in the range of 2900 to 3200° F. so as to decompose and oxidize said silicone to pure silica and react said silica with alumina to form mullite.

4. A process for manufacturing glass-free shaped refractory articles of alumina bonded with mullite which comprises preparing a plastic homogeneous mix of powdered alumina of at least 99% purity and a silicone, the alumina in said mix being in excess of that required to react with all of the silica equivalent of the silicone to form mullite, forming said mix into shapes, firing said shapes at a temperature in the range of 2900 to 3200° F. so as to decompose and oxidize said silicone to pure silica and react the silica with alumina to form mullite as a bonding material between the crystals of free alumina.

5. A process for manufacturing glass-free refractory pebbles consisting essentially of alumina bonded with mullite which comprises preparing a plastic homogeneous mix of powdered alumina of at least 99% purity and a silicone, the alumina in said mix being in substantial excess of that required to react with all the silica equivalent of the silicone to form mullite, forming said mix into spheres of a diameter in the range of 1/16" to 1", firing said spheres at a temperature in the range of 2900 to 3200° F. so as to decompose and oxidize said silicone to pure silica and react said silica with alumina to form mullite as a bonding material between the crystals of free alumina.

6. The process of claim 2 in which the silicone is a normally liquid silicone which serves as a plasticizer for said mix.

7. The process of claim 2 in which the silicone is normally solid and is incorporated in solution form in said mix.

8. The process of claim 5 in which the silicone is normally solid and is incorporated in said mix in powdered form together with a suitable volatile plasticizing agent.

9. A process for manufacturing glass-free small refractory spheres for pebble heater heat-transfer use which comprises preparing a homogeneous plastic extrudable mix of alumina of at least 99% purity and a silicone in a mol ratio of alumina to silicon greater than 3 to 2, extruding said mix in rod form, cutting the extrudate into slugs of a length approximating their diameter, forming said slugs into compact spheres by rolling and tumbling, firing said spheres at a temperature in the range of 2900 to 3200° F. until the silicone is converted to pure silica and all of said silica is reacted with alumina to form mullite as bonding material for the unreacted alumina crystals.

10. The process of claim 9 in which the silicone is normally liquid, which serves as a plasticizing agent for said mix and temporary binding agent in said spheres.

11. A process for manufacturing glass-free refractory articles consisting essentially of refractory material bonded with mullite, which comprises preparing a homogeneous plastic mix of refractory material comprising alumina together with a compound selected from the group consisting of silicones and derivatives of silicones which are converted to pure siilca by firing, the alumina being in stoichiometric excess of the silica equivalent of said compound required to form mullite with said alumina, forming said mix into shapes, and firing said shapes at a temperature in the range of 2900 to 3200° F. so as to decompose and oxidize said silicone to pure silica and react said silica with said alumina to form mullite as a bond for the refractory material.

LOUIS C. BEARER.

References Cited in the file of this patent

UNITED STATES PATENTS

| Number | Name | Date |
|---|---|---|
| 2,027,931 | Ray | Jan. 14, 1936 |
| 2,348,847 | Pike | May 16, 1944 |
| 2,362,825 | Hutchins | Nov. 14, 1944 |
| 2,413,961 | Evans | Jan. 7, 1947 |
| 2,460,811 | Davies et al. | Feb. 8, 1949 |
| 2,478,757 | Foster | Aug. 9, 1949 |